(12) United States Patent
Baarman et al.

(10) Patent No.: US 10,397,741 B2
(45) Date of Patent: Aug. 27, 2019

(54) SYSTEM AND METHOD FOR SERVICE TRACKING

(71) Applicant: Shoreline Tracking Systems, LLC, Holland, MI (US)

(72) Inventors: David W. Baarman, Fennville, MI (US); Bruce A. Patterson, Holland, MI (US); Robert J. Zuker, Holland, MI (US); Thomas E. Deater, West Olive, MI (US)

(73) Assignee: Shoreline Tracking Systems, LLC, Holland, MI (US)

( * ) Notice: Subject to any disclaimer, the term of this patent is extended or adjusted under 35 U.S.C. 154(b) by 0 days.

(21) Appl. No.: 15/809,210

(22) Filed: Nov. 10, 2017

(65) Prior Publication Data
US 2018/0160269 A1 Jun. 7, 2018

Related U.S. Application Data

(60) Provisional application No. 62/420,848, filed on Nov. 11, 2016.

(51) Int. Cl.
| | |
|---|---|
| *H04W 24/00* | (2009.01) |
| *H04W 4/02* | (2018.01) |
| *H04W 4/80* | (2018.01) |
| *G06Q 50/12* | (2012.01) |
| *H04W 4/90* | (2018.01) |
| *G01S 5/00* | (2006.01) |

(Continued)

(52) U.S. Cl.
CPC .............. *H04W 4/023* (2013.01); *G01S 5/00* (2013.01); *G06Q 50/12* (2013.01); *H04W 4/025* (2013.01); *H04W 4/029* (2018.02); *H04W 4/80* (2018.02); *H04W 4/90* (2018.02); *H04W 84/12* (2013.01)

(58) Field of Classification Search
CPC ..... H04W 84/12; H04W 88/08; H04W 76/10; H04W 4/80; H04W 84/20; H04W 76/15
See application file for complete search history.

(56) References Cited

U.S. PATENT DOCUMENTS

| | | | |
|---|---|---|---|
| 9,584,773 B2 * | 2/2017 | Chien | ..................... H04L 67/18 |
| 2014/0056209 A1 * | 2/2014 | Park | ..................... H04W 16/26 |
| | | | 370/315 |

(Continued)

*Primary Examiner* — Khalid W Shaheed
(74) *Attorney, Agent, or Firm* — Warner Norcross + Judd LLP

(57) ABSTRACT

A system to assist in monitoring and improving services in hotels, motels and other lodging facilities. The system includes a plurality of fixed-location wireless devices that are situated throughout the facility and each service provider or asset to be monitored or tracked is provided with a cooperating mobile wireless device. The mobile devices may periodically transmit beacons that are received by the fixed location devices. The system may determine location based on evaluation of signal strength across a plurality of fixed devices. The system may include premapped calibration data on signal strength to assist in determining location. The location information may help to assess employee performance, to assist in improving performance and to provide improved services. The system may also interact with an application running on a hotel guest's electronic device to allow the system to track guest location. Guest location information can be used to provide improved guest services.

11 Claims, 12 Drawing Sheets

(51) Int. Cl.
*H04W 4/029* (2018.01)
*H04W 84/12* (2009.01)

(56) References Cited

U.S. PATENT DOCUMENTS

2018/0012170 A1* 1/2018 Roberts ............ G06Q 10/06311
2018/0124732 A1* 5/2018 Kamthe ................ H04W 24/10

* cited by examiner

Figure 7

Employee Ranking Summary

Manager – Rick Hering 657123

Top Employee – Nancy Carter
Most Improved Lucy Timmer
Newest Employee – Lucy Timmer

Room Standards

| Type | Minutes | Trend |
|---|---|---|
| Double | 18 | ↔ |
| King | 20 | ↓ |
| Suite A | 24 | ↓ |
| Suite B | 28 | NC |

Employee Rankings Overview

| Name | Identification | Days to Norm | Average | 10 Day Trend | Rooms Cleaned |
|---|---|---|---|---|---|
| Lucy Timmer | 786551 | 52 | 22.5 | ↑ | 123 |
| Samantha Brown | 745332 | 45 | 18.4 | ↓ | 1256 |
| Candy Smith | 560112 | 32 | 16.6 | NC | 2232 |
| Sarah Reahm | 558912 | 28 | 15.9 | NC | 6512 |
| Nancy Carter | 512896 | 22 | 15.4 | ↑ | 8400 |

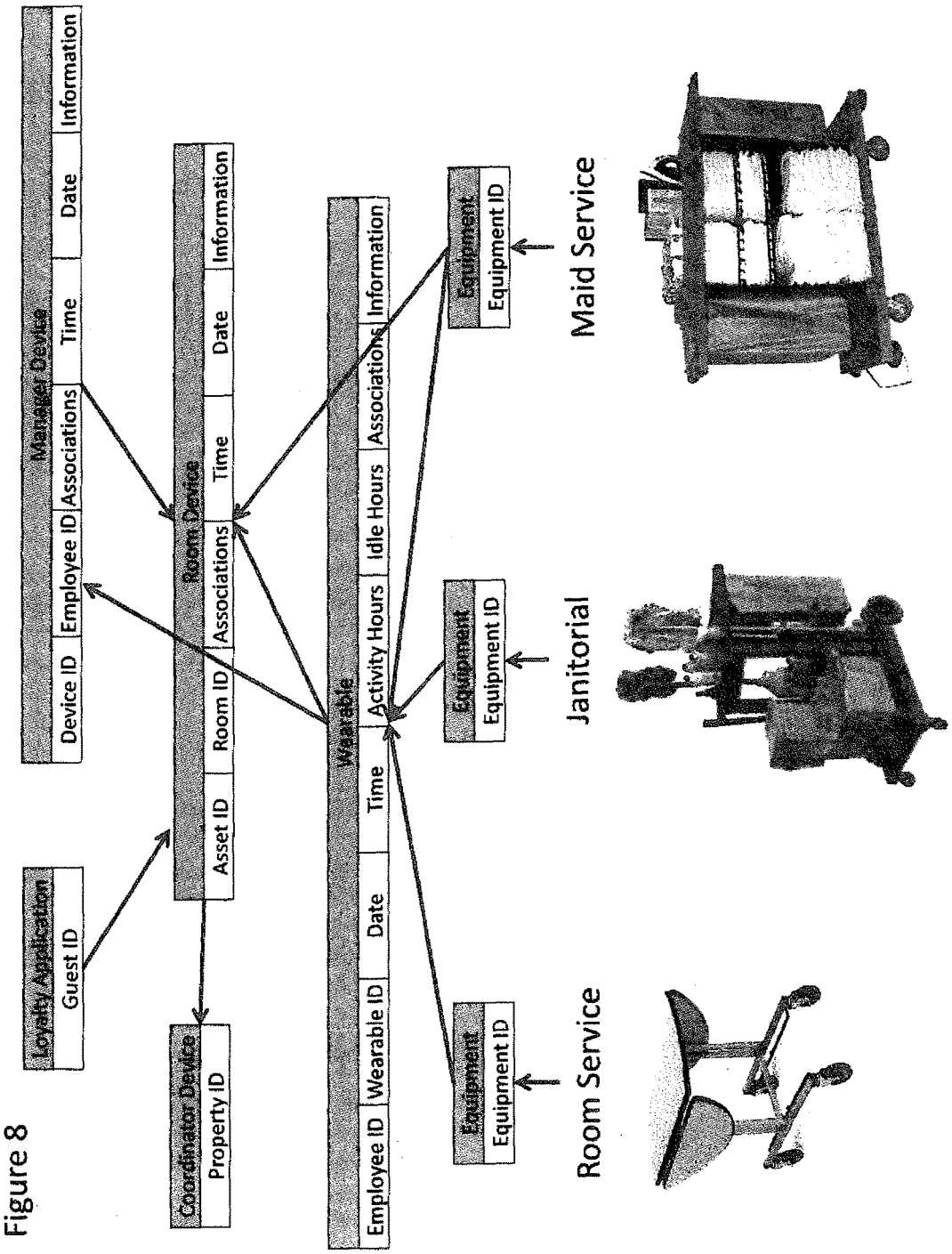

Figure 9

Location and Calibration Table

Threshold 20%

| Location | A | B | C | D | E | F | G | H | I-Z | Totals |
|---|---|---|---|---|---|---|---|---|---|---|
| Avg. ID Signal | 22 | 15 | 90 | 88 | 14 | 22 | 10 | 12 | 0 | |
| Avg. Signal Offset | 78 | 85 | 10 | 12 | 86 | 78 | 90 | 88 | 100 | |
| Upper Threshold | 26.4 | 18 | 108 | 105.6 | 16.8 | 26.4 | 12 | 14.4 | 0 | |
| Lower Threshold | 17.6 | 12 | 72 | 70.4 | 11.2 | 17.6 | 8 | 9.6 | 0 | |
| Actual Signal | NA | 35 | 100 | 66 | 15 | 23 | 9 | 10 | NA | 284 |
| Deviation Score | 0 | 17 | 0 | -4.4 | 0 | 0 | 0 | 0 | NA | 12.6 |
| Threshold Score | 8.8 | 6 | 36 | 35.2 | 5.6 | 8.8 | 4 | 4.8 | NA | 109.2 |

Location Example

Max Dev. Threshold 21.84

Pass/Fail PASS

Calibration Identification Protocol

| Node Identifier | Calibration Flag | Calibration Room Identifier | Floor Identifier | Location Coordinate Examples |
|---|---|---|---|---|
| 32-512 Bit identifier | On | Guest 1010 | 10 | Entry |
| 32-512 Bit identifier | On | Guest 1010 | 10 | Window |
| 32-512 Bit identifier | On | Guest 1010 | 10 | Bathroom |
| 32-512 Bit identifier | On | Guest 1010 | 10 | Bed |
| 32-512 Bit identifier | On | Guest 1010 | 10 | Desk |
| 32-512 Bit identifier | On | Guest 1010 | 10 | TV |
| 32-512 Bit identifier | On | Guest 1010 | 10 | Center room |
| 32-512 Bit identifier | On | Guest 1010 | 10 | NE Corner |
| 32-512 Bit identifier | On | Guest 1010 | 10 | SE Corner |
| 32-512 Bit identifier | On | Guest 1010 | 10 | NW Corner |
| 32-512 Bit identifier | On | Guest 1010 | 10 | SW Corner |

Figure 10

SYSTEM AND METHOD FOR SERVICE TRACKING

BACKGROUND OF THE INVENTION

The present invention relates to the hotel industry and more particularly to automated systems and methods for assisting in the monitoring, information collection, decision making, training and providing services in the hotel industry.

The hotel industry is a service-based industry with minimal computer infrastructure supporting efficiency and monitoring. The top 10 hotel companies have over 42,000 properties with over 4,000,000 rooms. Today, when the maids are cleaning rooms and a customer would like an early check in, the management will typically call up to the service crew and they manually respond on availability. The way crews select rooms, the way they determine priority in what rooms will need availability first and ways to optimize the floor for service are mainly manual today. This industry is also known for rapid turnover of employees due to the nature of the work. This impacts quality control, consistency and training and causes service related impact to the chain.

Looking past the maid service and management the other services in the hotel industry can also benefit from a more systematic process in service training, coaching, tracking and delivery. In many cases, service-related issues occur because the hotel staff does not know when a guest is in the room. Knowing when a guest is in the room can also eliminate wasted time and bother a guest.

The hotel industry could benefit from a system that assists in addressing one or more of these issues.

SUMMARY OF THE INVENTION

The present invention provides an automated system that assists in monitoring and improving services in hotels, motels and other similar facilities. The system includes a plurality of fixed-location wireless devices that are situated throughout the facility and each service provider or asset to be monitored or tracked is provided with a cooperating mobile wireless device. Interaction between the fixed-location wireless devices and the mobile wireless devices allows the location of each mobile device and consequently the associated service provider or asset to be determined. The location information is pushed to the cloud (e.g. Internet) or other network, such as a facility-wide network. The information is centrally collected and processed for use in a variety of ways.

In one embodiment, each service provider is given a wearable device that includes the mobile device. The wearable device interacts with the fixed-location wireless devices situated through the facility to allow the system to know the location of the service provider at all times.

In one embodiment, specific assets are provided with the mobile device. For example, a maid cart, a room service cart and a room service tray may be fitted with mobile devices that allow the system to know the location of the asset.

In one embodiment, each hotel guest is provided with an application that can be run on the hotel guest's smartphone or similar personal electronic device. The application may enable a wireless device incorporated into the personal electronic device that is capable of interacting with the fixed-location wireless devices situated throughout the facility.

In one embodiment, the system includes a plurality of beacon readers. For example, there may be one or more beacon readers situated in each room. The beacon readers may be standalone devices or they may be integrated to other electronic appliances, such as a USB power hub, an alarm clock, a wireless charger, a television, a wall outlet, a data center on an desk or lighting. The beacon reader may be a conventional beacon reader configured to read conventional BTLE beacons, such as the type currently incorporated into a range of smartphones and other personal electronic devices.

In one embodiment, each mobile device includes a beacon transmitter. The beacon transmitter may be a conventional beacon transmitter configured to transmit conventional BTLE beacons, such as the type currently incorporate into a range of smartphones and other personal electronic devices. As the mobile devices moves throughout the facility, the various fixed-location beacon readers collect information from the beacon and push it to the network for collection and process by a central computer associated with that facility or a group of facilities.

In one embodiment, the system includes a location algorithm that processes the information obtained by the fixed-location devices to produce location data with improved accuracy. For example, in one embodiment, the central processor may determine the location of the mobile device to be associated with the fixed location device that receives the strongest signal. The base algorithm utilizes RSSI and a table or map/table with identified hubs. These hubs sample signals and identify which are within range for that room. That ID data is sampled to assure it was not a transient and if it is seen to be a real signal over time that ID information is logged by that hub as seen in that area associated with that hub and location ID.

In one embodiment, the system includes a calibration system that adds a confirmed data layer to the location algorithm. The calibration system may be configured to allow the service tracking system to collect and pre-map beacon signal strength throughout the facility. This calibration data may be used during processing of realtime beacon to improve location determination. In one embodiment, the calibration system builds and maintains a separate signal strength table for each room. Each signal strength table may include signal strength information not only for the fixed location device located in that room, but also other fixed location devices that receive the calibration beacon. In one embodiment, the central processor determines location at least in part by comparing realtime beacon signal strength measurements across multiple fixed location devices against each of the calibration signal strength tables. The central processor may implement essentially any form of statistical analysis to make this determination.

Today, it is becoming more and more difficult to get the right message to employees. Identifying and enhancing behaviors and performance is a sensitive management effort and the management across the system may not have the skills to produce consistent results. In one embodiment, this system seeks to test and augment these systems identifying strengths and weakness within that system. Another problem this technology helps to solve is the history of performance and behavior over the calendar cycle and employee experience. Tracking the trends and behaviors it will be easy to see exceptional performers and identify poor performers quickly. By enabling this insight we can push coaching materials and performance rankings in an attempt to see the impact of the materials and the propensity of the individual to adopt these materials and change behavior. This further builds the system profiles identifying these characteristics over time enabling better decisions and enhanced communications that impact behavior for specific employee classifications within specific job functions.

The present invention provides automated systems and methods that are able to significantly improve service within the hotel and hospitality industry. The service tracking system has the ability to accurately track employee and asset location, thereby allowing a wide range of data to be collected, analyzed and used in the provision of services. Realtime location information can be used to assess employee performance, to assist in improving performance, to provide greater manager understanding and oversight and to provide improved services. The system may also integrate with an application running on a guest's smartphone or other handheld device. The use of mobile devices that transmit periodic signals provide a better power consumption profile than if conventional beacon technology was employed. The system may use calibration to improve location determinations. By premapping signal strength using a calibration device, the system may be able to enhance accuracy and speed by comparing realtime signal strength data against recorded calibration data. Calibration data from various fixed location may be collected for each room in which the calibration device is situated. This allows a wider range of calibration data to be used in determining location.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 7 is an illustration showing select information that can be obtained using an embodiment of the present invention.

FIG. 8 is an illustration of the data protocol and data transfer sequence of an embodiment of the present invention.

FIG. 9 is an illustration showing select data recorded by fixed-location devices in one embodiment of the present invention.

FIG. 10 is a table showing select calibration identification information that might be employed in an embodiment of the present invention.

DESCRIPTION OF THE CURRENT EMBODIMENT

Overview.

Figure 1:
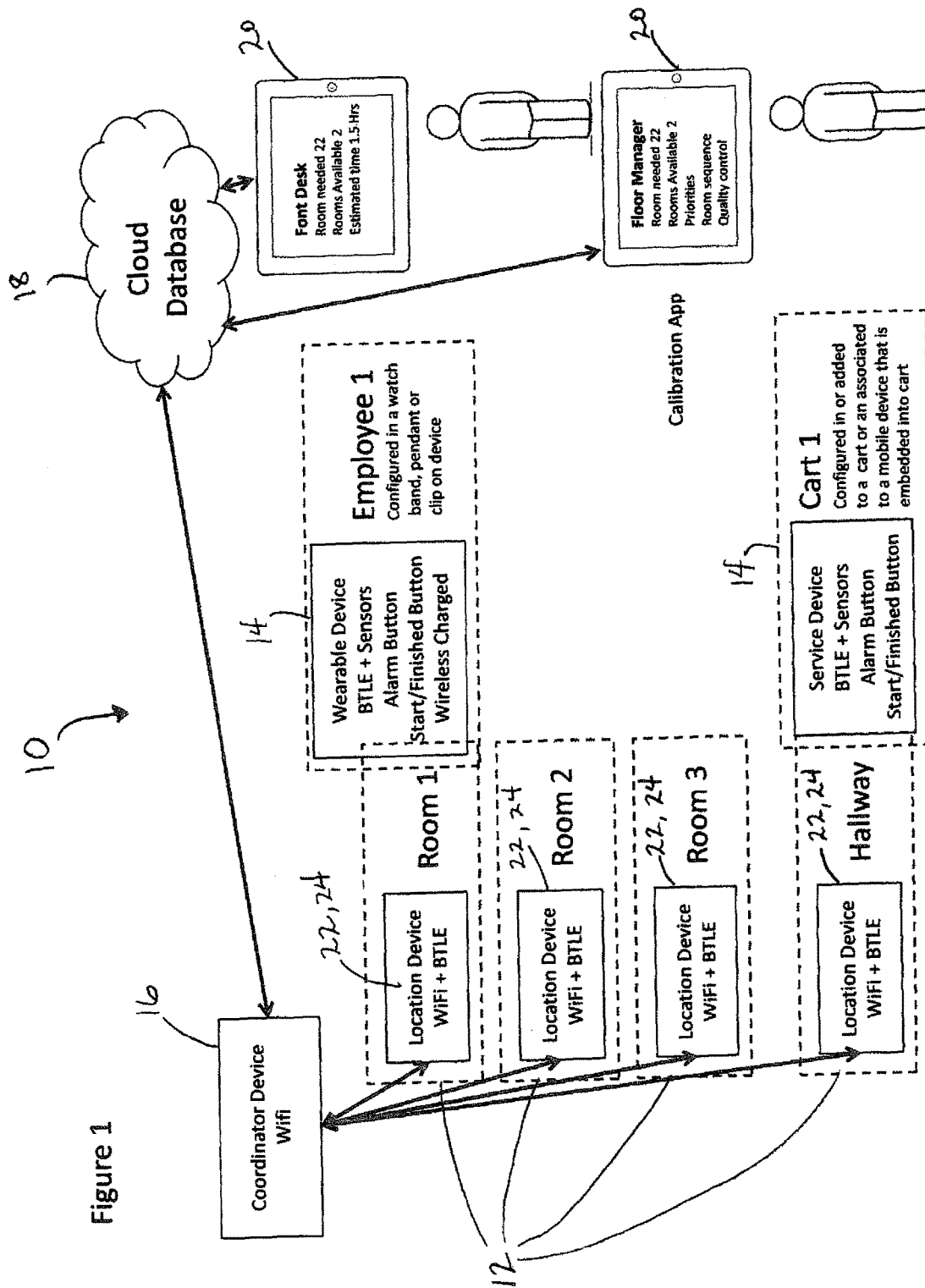
FIG. 1 is a schematic representation of a service tracking system in accordance with an embodiment of the present invention.

A service tracking system in accordance with an embodiment of the present invention is show in FIG. 1. The service tracking system 10 generally includes a plurality of fixed-location devices 12, a plurality of mobile devices 14, a coordinator device 16, a cloud-based central processor/database 18 and a pair of manager devices 20 that communicate with the cloud database 18. In this embodiment, the fixed location devices 12 each include a beacon reader 22, such as a BTLE beacon reader, and a wireless communication system 24, such as a WiFi interface. The coordinator device 16 may be connected to the various fixed location devices 12 via wireless (or wired) communications, such as WiFi. The information collected by the coordinator device 16 from the various fixed location devices 12 may be pushed or otherwise transferred to the cloud processor/database 18. The central processor 18 (or a plurality of distributed processors associated with the system 10) may process the data received from the various fixed location devices 12 to determine the location of the mobile devices 14 with appropriate precision. In many case, the central processor 18 will rely on data from a plurality of different fixed location devices 12 to determine location. The central processor 18 may be configured to maintain a database of location and time information for each mobile device 12. The collected data may also be processed by the central processor 18 to provide a wide range of analytics, such as employee or asset specific analytics or facility-wide or company-wide analytics. This may include the actual time required for a specific employee to complete a specific task, the average time required for a specific employee to complete a repeated task, the average time for all employees to complete the specific task and trend information, such as changes in time required to complete a task over time. To enhance accuracy, the service tracking system 10 may implement a calibration method that includes pre-mapping signal strength measurement to assist in realtime determination of mobile device 14 location. The service tracking system 10 may also have the ability to interact with an application running on a guest's smartphone or similar device. The application may cause the guest's smartphone to periodically send beacons that allow the service tracking system 10 to identify the location of the guest and to provide enhanced services based on that information. For example, the application may allow the service tracking system 10 to know when the guest has left the guest's room so that housekeeping can clean or to set the guest's room preferences, such as lighting, temperature, alarm wake up time or television channel/volume. As another example, the application may allow the service tracking system 10 to provide the guest with location specific information, such as a restaurant menu when in the restaurant, directions to a hotel facility (e.g. pool, bar or restaurant) upon request, room service menu when in room or television channel line-up when in room.

The present invention is described in the context of a conventional multiple-room, multiple-story hotel. The invention may, however, be adapted for use in a variety of alternative facilities, including a wide range of alternative lodging establishment of alternative configurations.

Service Tracking System.

In one aspect, the present invention provides a system and method for keeping an accurate account of service tracking. This method uses tracking systems, tools, mobile devices and customized equipment to create a network that gathers information and creates a business view of the activities performed.

If a room is not made up it cannot be rebooked. Tracking and identifying these opportunities in real time improves the customer experience.

- System may track what maid cleaned what room and the time that was taken.
- System may allow rebates for people that keep the room clean.
- System may allow for bill backs for cleaning charges when time limits have been exceeded.
- A system may track and locate tagged assets, employees and guests to track certain performance efficiencies and improve the guest experience.
- System may include mobile devices that can be worn or can be part of a cart, tray or billing device.
- System may be configured to read presence of guest in room through a guest device running a loyalty application.
- The system may be configured to predict when additional rooms will be ready for guests.
    - The system may predict room open rates by taking the number of staff cleaning rooms and the present average time being taken to clean the room. This may then be interpolated over a list of people waiting for early check in and give estimated room availability times.
    - The system may allow for an application to be provided so that the customer can easily see the progress and when a room is ready.
- The tracking system may be for employees and customer experience, by allowing real time data to be presented it provides a better user experience. Employees may be given feedback on the number of customers waiting for rooms and the customers may be permitted to see the time it will take for the service personnel to get the rooms cleaned. By enabling this level of communications, the system may also enable security features.
- System may generate a security packet of information that includes the following:
    - Employee ID
    - Location ID
    - Time/Date
    - Activity
    - Emergency Priority if employee has pressed a panic button
        - Carts and other tagged assets can also have an alarm that show an emergency.

Generally speaking, the service tracking system 10 may include an ecosystem with a plurality of devices that are configured to interact in accordance with an embodiment of the present invention. These devices can be utilized and productive in many configurations of the present invention.

- The system may utilize the WiFi network in the hotel.
- The fixed location devices may include beacon readers in rooms that may be stand alone or incorporated in other accessories.
    - USB power, Alarm clock, wireless charger, TV etc.
- The system may interact with a guest device, such as a smartphone, with a beacon enabled by using the loyalty application.
    - Device may sends Guest ID to system.
- The system may include wearable devices for the service personal.
    - May include alarm/panic button.
    - May include activity tracker and wireless power.
    - The wearable devices may be associated with asset tags, such as device or equipment ID's and Cart ID's.
- The system may include mobile devices in cart (e.g. maid carts, room service carts and janitorial carts) to transmit Cart ID.
    - May have alarm built in to cart.
- The system may include a mobile device and mobile application for the service manager.
    - May send Device ID and Employee ID and other information collected by the system to track quality and compliance.
- The system may include an application for desk personnel.
- The system may include a mobile device and application for service personnel.
    - The service personal application may include a management program for quality control and reporting.
    - The system may allow prioritizing the rooms needed.
    - The system may rank of staff on performance and quality.
- The system may be configured to anticipate what types of rooms are needed and assure that these are the first rooms cleaned.
    - The system may permit messaging to service personal from front desk.

Many hotels have standards for room servicing. The standard for some hotels is seventeen minutes if guest not rolling over, 20-something if they are. This device allows a Housekeeping Manager to track the progress and highlight areas/personnel who are or are not performing to standard. However, this system does not necessarily coach personal and may instead leave that to the manager. The aspect of real time, accurate, efficiency tracking may provide significant value to the hotel. Additionally, for facilities which are spread out, such as airports or large office complexes, the device provides location tracking of personnel and assets by room and by floor, and may enable faster communications and provide information that would normally have to be tracked down manually. This information may allow the team to be more effective and timely.

In another aspect, the present invention provides a tool to save time and manage staff in ways that provide a better customer experience while lowering the cost to serve. This system accomplishes this by providing a system and method for recording the activities for the best practices and process from the best in class workers. This information may be shared to coach new employees at set best practices. In use, employees may be ranked with opportunities defined for improvement. The staff mobile device is used to coach and record activities and process times.

The mobile device can provide expected times per process.
        Timer for cleaning the toilet, sink, bathtub and shower.
        A visible means to show the times and steps for each of these processes.
        Pictures and standards for how the room should be configured
        Problems with rooms can be shared and recorded
    The system may provide an analytics system for tracking ROI and ongoing performance metrics across the organization.
        Analytics may be provided by room, by property or by chain.
        Equipment and hardware like vacuum and cleaning tools can be easily compared for performance improvements.
        Saving a few minutes per room can be very impactful.

Coaching and training today is left in the hands of each specific manager and does not really support a service brand. By listening, motivating and unifying coaching and messaging we can enable the best messaging and coaching materials for both employees and management. FIG. 10 shows a system that statistically samples messages against employee types to enable positive behavior change. This data is used in small samples to sway larger messaging and behavior modification for management and employee growth while assuring the highest level of happiness and positive feedback. In the past these systems are handled manually and it is easy to see how that system cannot inform a management team as to shifts and changes in employee happiness and behaviors let alone testing statistically messaging and coaching success or failures. Using an automated system that is also monitoring performance becomes a powerful tool.

As noted above, the service tracking system 10 includes a plurality of fixed location devices 12 and mobile devices 14 that interact using wireless technology to collect information that is used to determine location. The design and configuration of these devices 12 and 14 may vary from application to application. In the illustrated embodiment, the devices 12 and 14 include generally conventional BTLE (Bluetooth Low Energy) beacon technology. The system 10 may implement any suitable beacon protocol, such as Apple's iBeacons protocol or a more generic alternative. With this technology, a transmitting device is configured to periodically transmit a beacon using Bluetooth technology. The receiving device is configured to monitor for the beacon. It should be noted that with conventional BTLE beacon applications, this information is used simply to determine the general proximity of the transmitter with respect to the receiver. For example, when a smart phone running an appropriate application comes within sufficient proximity of a beacon, the application may determine that the beacon has been received by the smart phone and provide location based information associated with that beacon, such as advertising or other information relevant that may be of interest. This conventional method of using BTLE beacons is not suitable for use in the present application because, among other things, it does not provide the desired level of precision as it is associated with distance from the beacon transmitter and not presence within a specific room. Further, the use of fixed location devices that transmit beacons is problematic for a variety of reasons, including perhaps most notably the power implications associated with a mobile device that receives and processes a plurality of beacons.

Figure 12:
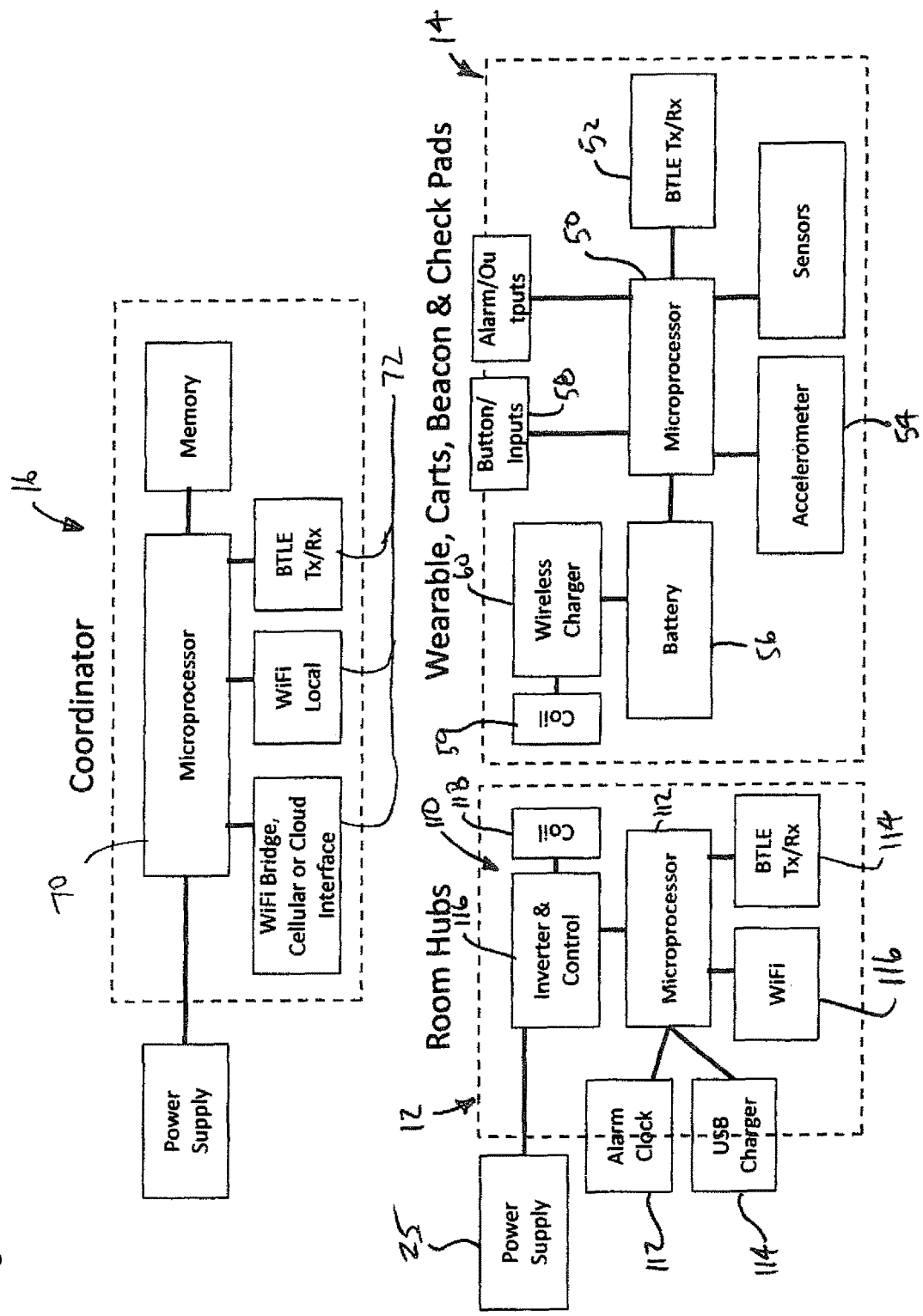
FIG. 12 shows the block diagrams for the coordinator, portable unit in the wearable, cart, check pad and tags. It also shows the hub device as both a functional device like a charger or alarm clock or this can also be stripped down to be just a monitoring hub.

In the illustrated embodiment, the fixed location devices 12 are the beacon receivers and the mobile devices 14 are the beacon transmitters. For example, in the context of a hotel, each hotel room may include a fixed location device 12 with a beacon reader 22 (See FIG. 1) that is configured to receive beacon signals transmitted by the mobile devices 14. The fixed location readers 12 of this embodiment also have the capability of determining received signal strength. For example, each fixed location device 12 may include circuitry for determining signal strength of the received mobile device signal, such as Relative Signal Strength Index ("RSSI") or dBm determinations or measurements provided by the wireless communication transceiver or chipset in the fixed location device. The fixed location devices 12 of this embodiment are configured to communicate with one or more coordinator devices 16. To facilitate this communication, the fixed location devices 12 and coordinator device 16 may include a wireless communication system 24, such as WiFi technology or essentially any other wireless technology. Alternatively, the fixed location devices 12 may communicate with the coordinate device 16 via wired communications. One example of a fixed location device is shown in FIG. 12. In this example, the fixed location device 12 is a room hub that, in addition to being a fixed location device, provides a variety of additional functions, such as a wireless charger 110, an alarm clock 112 and a USB charger 114. In this embodiment, the fixed location device includes a power supply 25, an inverter 116 and coil 118 for the wireless charger 110, a microprocessor 112, a BTLE transceiver 114 for receiving beacons from mobile devices 14 and a WiFi transceiver 116 for communicating with a coordinator device 16. In the illustrated embodiments, the mobile devices 14 transmit a beacon that includes the device ID, such as a UUID or other suitably unique identification. The beacon signal may optionally include other data fields, such as an employee ID, a time stamp, a calibration flag and essentially any other desired data. The beacon readers 22 receive the beacon signals and pass the mobile device ID to the coordinator device 16 along with a fixed location device ID, a time stamp and the corresponding signal strength information. The coordinator device 16, in turn, pushes or otherwise communicates the information received from the various beacon readers 22 to the cloud, for example, to a central processor/database 18. The central processor 18 processes and stores received data to provide the desired feedback.

The mobile devices 14 may be implemented in a variety of alternative ways, such as wearable items that are worn or carried by an individual or asset tags that are attached or built into assets to be incorporated into the system. For example, with regard to wearable items, a mobile device 14 may be incorporated into a watch, bracelet, pendant or clip-on device (see FIG. 4). Each wearable device may include one or more buttons (or other user inputs) that allows the wearer to send a signal associated with the button. For example, a button may be provided as an emergency button to call for help or start/finished buttons may be provided to allow a wearer to designate when a task is started and when a task is finished. With regard to asset tags, a mobile device 14 may be incorporated into an electronic package that is embedded within or affixed to the exterior of an asset to be tracked. In the illustrated embodiment, the service tracking system 10 includes carts, trays, billing tablets, and tags with mobile devices 14 that allow a program and related protocol to tracking these assets to specific locations. The design and configuration of the asset tag may vary from application to application. For example, in the context of a maid cart, the asset tag may or may not include an alarm button and/or a start/finished button depending on the desired functionality. Similarly, a room service tray asset tag may be provided with or without an alarm button and/or a start/finished button. When provided, the alarm button and/or start/finish button may be used by the guest to indicate when the room services can be recovered from the room.

The service tracking system 10 also facilitates additional functions. For example, in the illustrated embodiment, each mobile device 14 includes an alarm button that allows the wearer to send an alarm signal. As noted above, the alarm button may allow the wearer to call for emergency assistance by sending a wireless signal to the fixed locations devices 12. In the embodiment, the fixed location devices 12 and the coordinator device 16 are configured to immediately relay the alarm signal to the central processor 18 so that appropriate action may be taken. This may include, for example, sending an emergency signal to the front desk, the manager, hotel security or essentially any other recipient. This action is merely exemplary and other actions may be taken, as desired.

Although not shown, the mobile devices 14 may also include a start/finished button (or separate start and finished buttons) that allow the user to indicate when a task has started and when it has been finished. For example, the buttons may be used to indicate when a maid begins work on a room and to indicate when the maid has finished work on that room. This information may help management to collect and better understand metrics relating to the associated task. Although described generally as buttons, the mobile devices 14 may include other types of user inputs, such has switches, touch sensors or other input mechanisms.

The mobile devices 14 may be rechargeable, and may be designed to have sufficient power for a singles day's use with nightly recharging. To facilitate recharging, the mobile devices 14 may be wirelessly charged.

Figure 4:
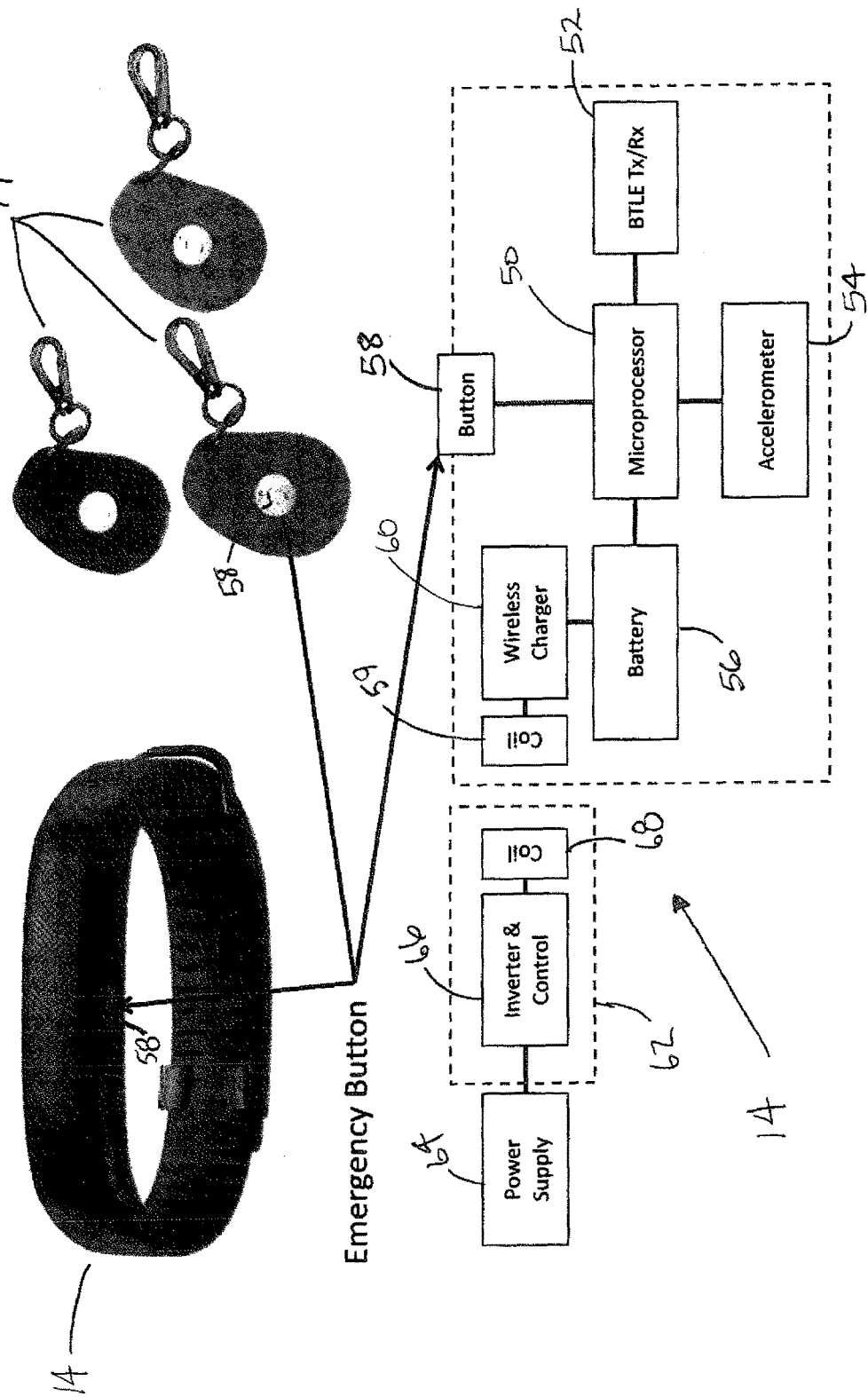
FIG. 4 is an illustration showing various wearable devices and a schematic representation of the associated circuitry.

FIG. 4 includes a schematic representation of one embodiment of a mobile device 14. In this embodiment, the mobile device 14 includes a microprocessor 50, a BTLE transceiver 52, an accelerometer 54, a battery 56 and a button 58. The microprocessor 50 may be essentially any processor suitable for implementing the functionality described herein. The BTLE transceiver 52 is a generally conventional BTLE transceiver and is used to transmit location beacons, calibration beacons and other messages (e.g. emergency/alarm messages) to the fixed location devices 12. In applications where the mobile device 14 does not receive incoming messages, the BTLE transceiver may be replaced by a BTLE transmitter. The BTLE transceiver may be replaced by other types of wireless communications transceivers/transmitters. In this embodiment, the accelerometer 54 provides data relating to movement or motion of the employee. For example, the accelerometer is used as an interrupt device. When timing wakes up the beacon, the accelerometer is samples for movement. Although in one embodiment, 100% movement tracking can be identified and tracked, this takes too much power so, in other embodiments, a timer scheme is designed to sample activity over time creating a resolution of activity that covers the specific requirements for the task. This turns off the accelerometer saving considerable battery between timed off battery segments.

In this embodiment, the mobile device 14 is configured for wireless charging. Accordingly, the mobile device 14 includes a coil 59 and wireless charger 60 configured to receive power from a wireless power supply 62 and charge the battery (or other power storage device, such as a supercapacitor). As shown, the wireless power supply 62 has a power supply 64, an inverter circuit 66 and a coil 68. The wireless power supply 64 and wireless charger 60 may be implemented in accordance with essentially any wireless power protocol, including an industry standard protocol, such as the "qi" standard, or a proprietary charging standard.

As noted above, the various fixed location devices 12 communicate to one or more coordinator devices 16. Although FIG. 1 shows a single coordinator, the number and location of coordinator devices 16 may vary from application to application. For example, it may be desirable to include multiple coordinator devices 16 when the fixed location devices 12 are too far apart to communicate with a single coordinator device 16. In such applications, a plurality of coordinator devices 16 may be installed in the system and each coordinator device 16 may be assigned to receive input for a subset of the fixed location devices 12. In the illustrated embodiment, the coordinator device 16 includes a microprocessor 70 and a wireless communication transceiver 72, such as a WiFi transceiver. Although the coordinator device 16 and fixed location device 12 are configured to communicate using WiFi in this embodiment, the devices 12 and 16 may communicate using wired communications or other forms of wireless communications.

The service tracking system 10 may be a cloud-based system that stores and tracks analytics, including, for example, building average times and times per employee for specific tasks. The system tracking system 10 may also provide for the check in, food service and bell services, respectively, that provides the information on progress, tasks completed and average times. In the illustrated embodiment, the information obtained by the fixed location devices 12 is collected, processed and stored centrally, for example, at a central processor/database 18 that is located in the "cloud" or other network. The coordinator device 16 (or devices) is configured to communicate information to the central processor 18 either wirelessly or through a wired connection. The central processor 18 may be programmed to process and store calibration data, to process realtime beacon strength to determine mobile device location and guest location, to store and/or make location data available and to make a wide range of information available to manager devices. The central processor 18 may also collect and process information relating to button presses on mobile devices 14. For example, the central processor 18 may execute a specific set of actions if the alarm or emergency button is pressed. This may include sending a priority message to a manager, security or others. As another example, if the button press is a "start" button the central processor 18 may store the time and set a start flag for a task associated with that mobile device and if the "finished" button is pressed, the central processor 18 may store the time set a finished flag for the pending task for that mobile device. Further, the central processor 18 may be configured to implement supplemental services associated with information obtained through a guest loyalty application or other guest mobile device. For example, the central processor 18 may provide automated control over appliances and other equipment within the guest's room or provide manager devices with guest location so that a manager can better manage services for that guest.

The illustrated system 10 also includes a computer interface application for the management of information running on a mobile device. This could be a floor management based system. In the illustrated embodiment, the service tracking system 10 includes one or more manager devices 20 that may, among other things, provide access to realtime location information for employees and tagged asset, allow review of performance data collected by the system, allow review of use data for tagged assets and may integrate with service management functionality that allows a manager devices 20 to assign tasks to employees and to assign assets to tasks and/or employees. As shown, the manager devices 20 may be mobile devices, such as tablet computers or handheld computers. Alternatively, the manager devices 20 may be desktop or other fixed-location computers. The management device will push coaching data to be relayed to staff and to that manager in real time as to how to optimize situations and communicate effectively to that manager and to employees. It can also provide a functional simulation of "walkie talkies" by allowing a push to talk system over WiFi to each management device. That same communications system can be a safety device with an alarm as well for employee safety and location.

FIG. 1 shows a hotel example of several rooms that each have a single fixed location device 12 that gathers mobile device ID's from the mobile devices 14 and passes them through the WiFi interface to the coordinator device 16. In this embodiment, the fixed location device 12 is implemented as a small electronic device that, as noted above, functions as a beacon reader that looks for BTLE identification and includes additional circuitry that relays received signals to the coordinator device 16. The fixed location device 12 may be imbedded into other functional products. The functional product may be an electronic device that receives wall power and is capable of supplying power to the fixed location device 12. Although the fixed location device 12 may be incorporated into essentially any functional product, FIG. 3 shows a wireless power charger example.

During use, the service tracking system 10 tracks the proximities of the Employee ID to the CART ID and the Room ID by signal strength and coordination. In one embodiment, the coordination is a relative strength between several fixed location devices 12 with a rules based decision engine. The rules engine determines relationships and relates timing, ID's and proximities to movement and locations. [Does this refer to the location and calibration table of FIG. 9? If so, this section may need to be woven into the location algorithm section below. If not, we will need to build out the content.] For example, cart 1 may be in the hallway advertising it's ID through the transmission of periodic beacons. Similarly, employee 1 may be in room 1 and the wearable mobile device 12 is advertising it's ID through the transmission of periodic beacons. The fixed location device 12 in each room that receives any of these beacons will sends that ID and any related information through the WiFi to the coordinator device 16. The coordinator device 16 then pushes that information to the central processor 18, which in this case is a cloud-based device. In this embodiment, the ID from the manager device 20 is also recognized as the software application advertises the device ID and the employee ID logged into the device 20. The device ID and employee ID may both be integrated into the periodic beacon. The front desk manager device 20 also has a software application that shows rooms cleaned, quality status, rooms requested, rooms checked out, the presence of the guest and more. The mobile application can also have a calibration application where the location is verified by an administrator password and a location can be verified and calibrated. An example of this location verification is to determine, after the service has been performed, whether a delivered meal made it to the proper room. This also allows the tracking of billing in room service and for management to track activity for planning.

Figure 2:
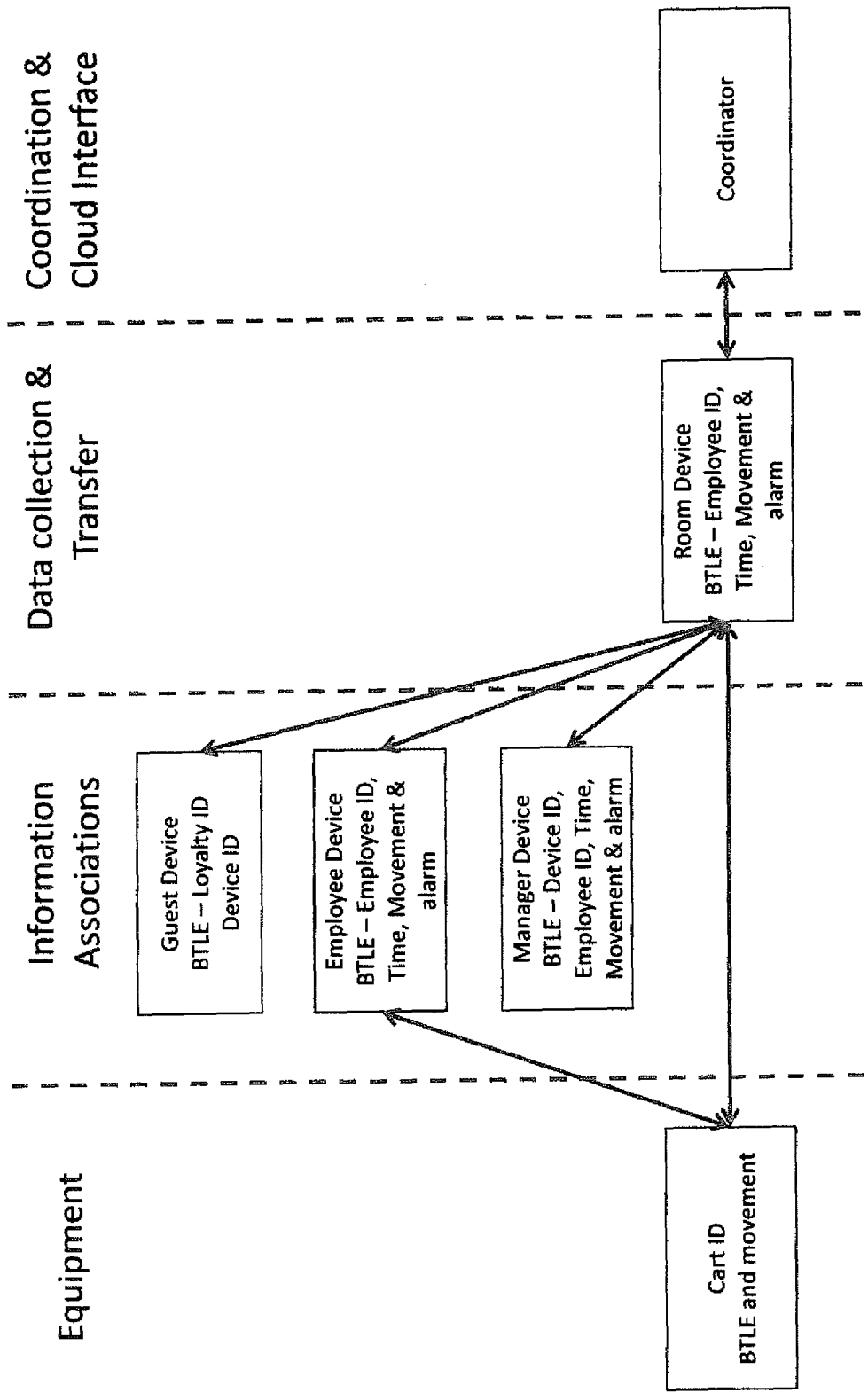
FIG. 2 is a functional flow diagram of an embodiment of an embodiment of the present invention.

FIG. 2 gives an example of some of the functional flow of devices and capability within one embodiment of the present invention. The equipment advertises an ID and the cart time and movement in any location. To illustrated, in one embodiment, the times ID event is augmented with a movement flag by sampling the accelerometer. A flag is set to indicate level of activity or non activity, 0-9 for example with 0 representing no activity and 9 representing a high level of movement like running and fast movement. This data is the associated with the next information. When a cart moves, the BTLE ID closest with the best signal level is associated to that cart. When that employee enters a room the Cart ID and Employee ID is sent through the coordinator device 16 to the central processor 18 then with activity time, signal strengths, proximity time and date information. The fixed location devices 12 send that data to the coordinator device 16 (or coordinator devices 16, if more than one exists) and then on to the central processor 18.

Figure 3:
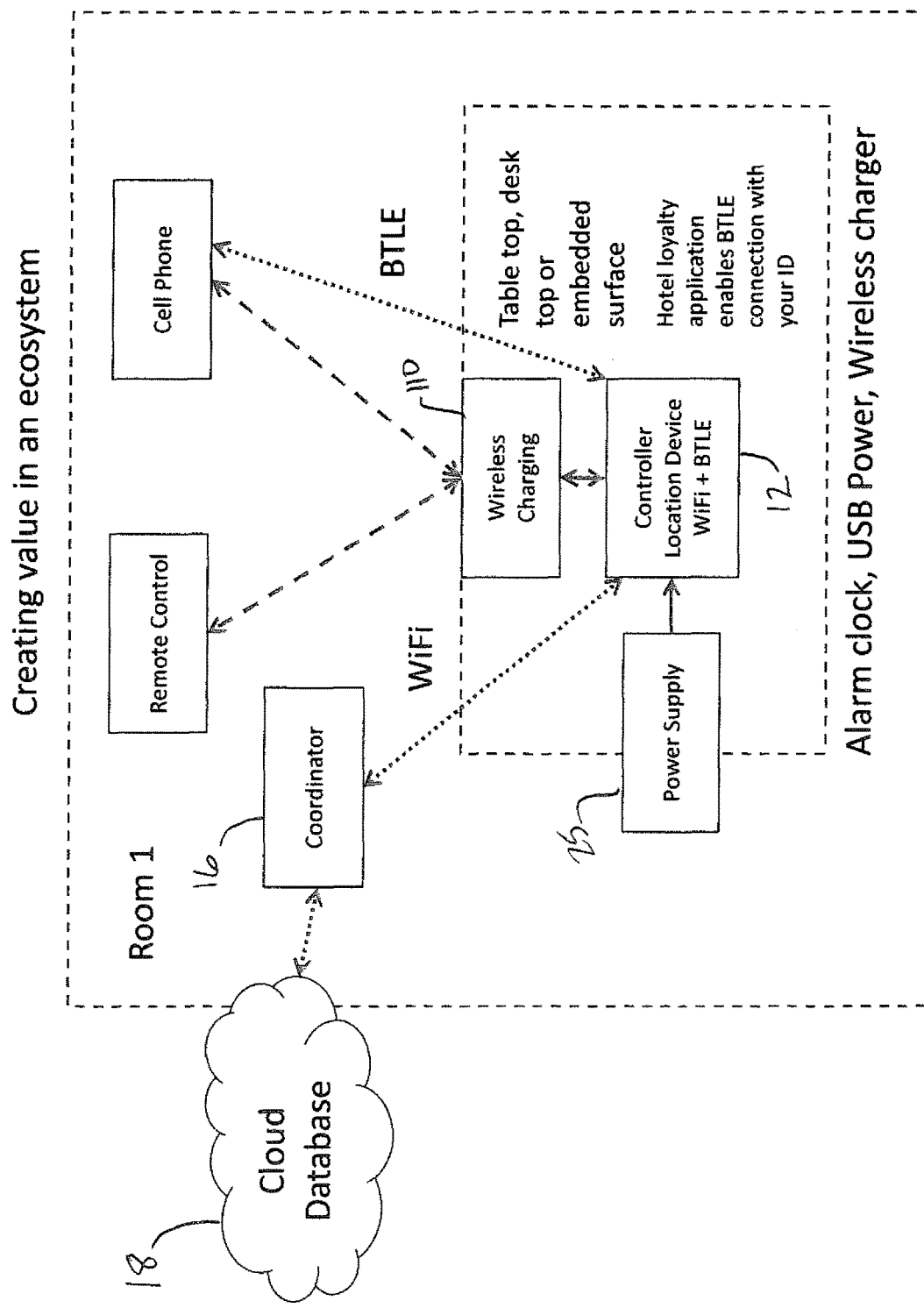
FIG. 3 is a schematic representation of a hotel room incorporating select components of an embodiment of the present invention.

FIG. 3 shows a room with a wireless charger that has a fixed location device 12 embedded into the electronics, including a beacon reader and a WiFi transceiver. Since most of the electronics are already required for the monitor the addition of a small amount of electronics could improve the value to the hotel and make it easier to retrofit. This is just one example of how a fixed location device 12 could be incorporated into a room. The fixed location device 12 may be integrated into other devices or appliances, or it may be a stand alone device.

FIG. 4 shows various possible device configurations used for the wearable devices. It can be worn on the wrist, clipped onto a pocket, worn in a pocket or worn as a pendant. These designs are merely exemplary and the mobile device 14 may take on essentially any form. In this embodiment, the emergency button is designed to send a priority code through the system with employee ID and location so security can respond quickly and accurately (or other action can be taken). In this example, the mobile device 12 is wirelessly charged and includes an accelerometer to track movement. For example, the device 12 may use the accelerometer to accumulates minutes of movement in each room. The device advertises a BTLE UUID signal that is picked up by the room device. That signal may be accompanied by essentially any other information that might be desired by the system 10, such as time, accelerometer data, employee ID, button push information.

Figure 5:
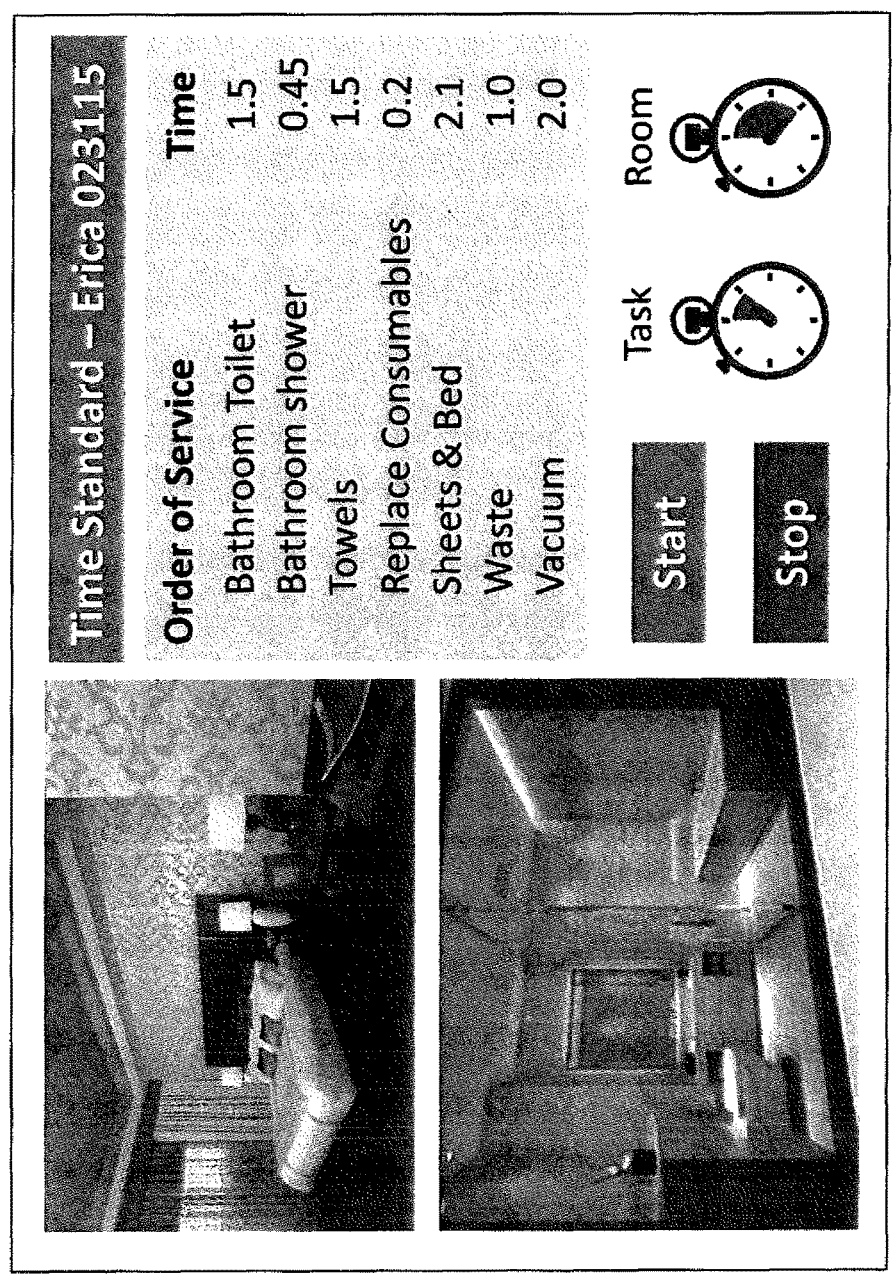
FIG. 5 is an illustration showing select information that can be obtained using an embodiment of the present invention.

FIG. 5 shows training content to be pushed to the application tracking time standards for training. The training information is recorded from past training and compared to the distribution curve over the experience of the employees to get ranking information against real data. That information is then measured and feedback from the employee is loaded for future feedback. For example, the outcomes from employee feedback, manager feedback and employee performance are statistically calculated and analyzed so that trends and best practices emerge and can be sorted by employee and employee types and locations. This exemplary system gives a much better perspective of the employee behavior and options to change that behavior, coach and improve performance for the employee and manager interaction.

Figure 6:
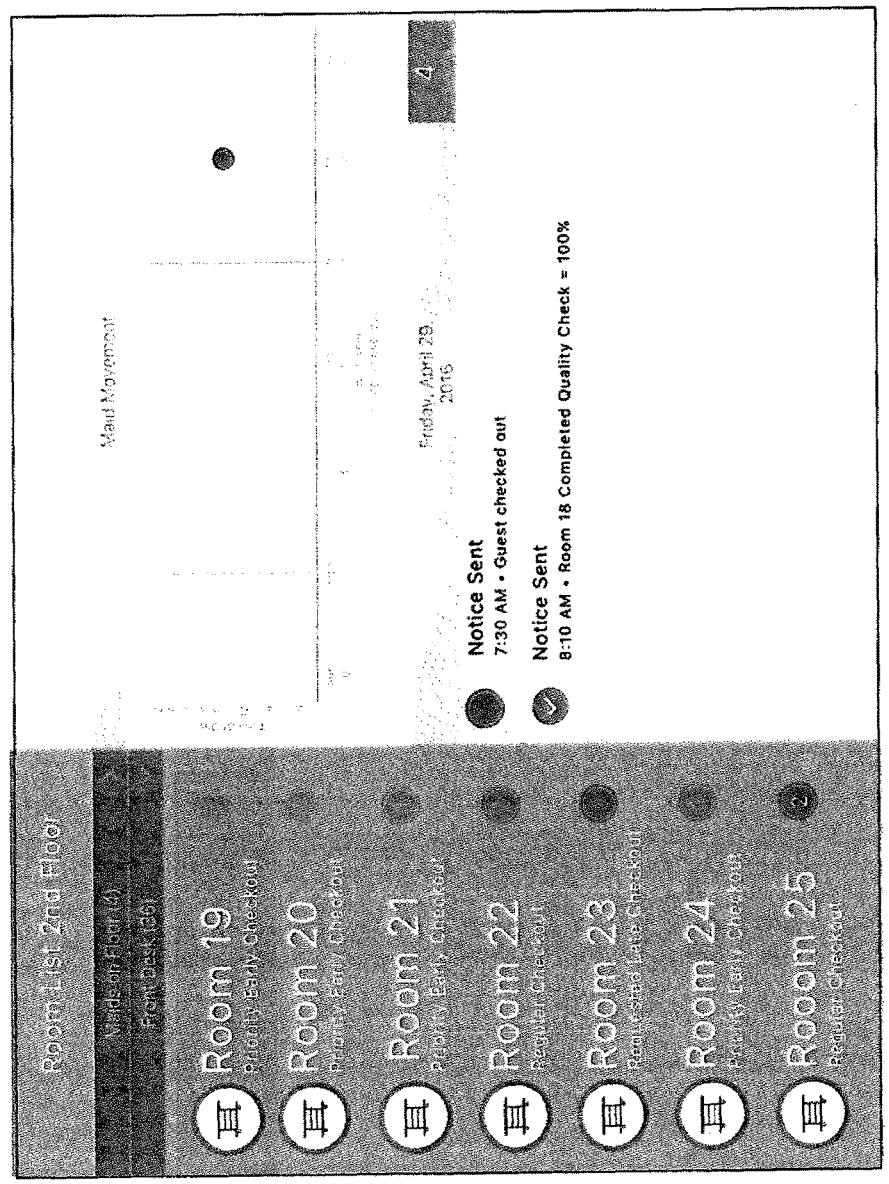
FIG. 6 is an illustration showing the user interface of a software application implementing an embodiment of the present invention.
Figure 11:
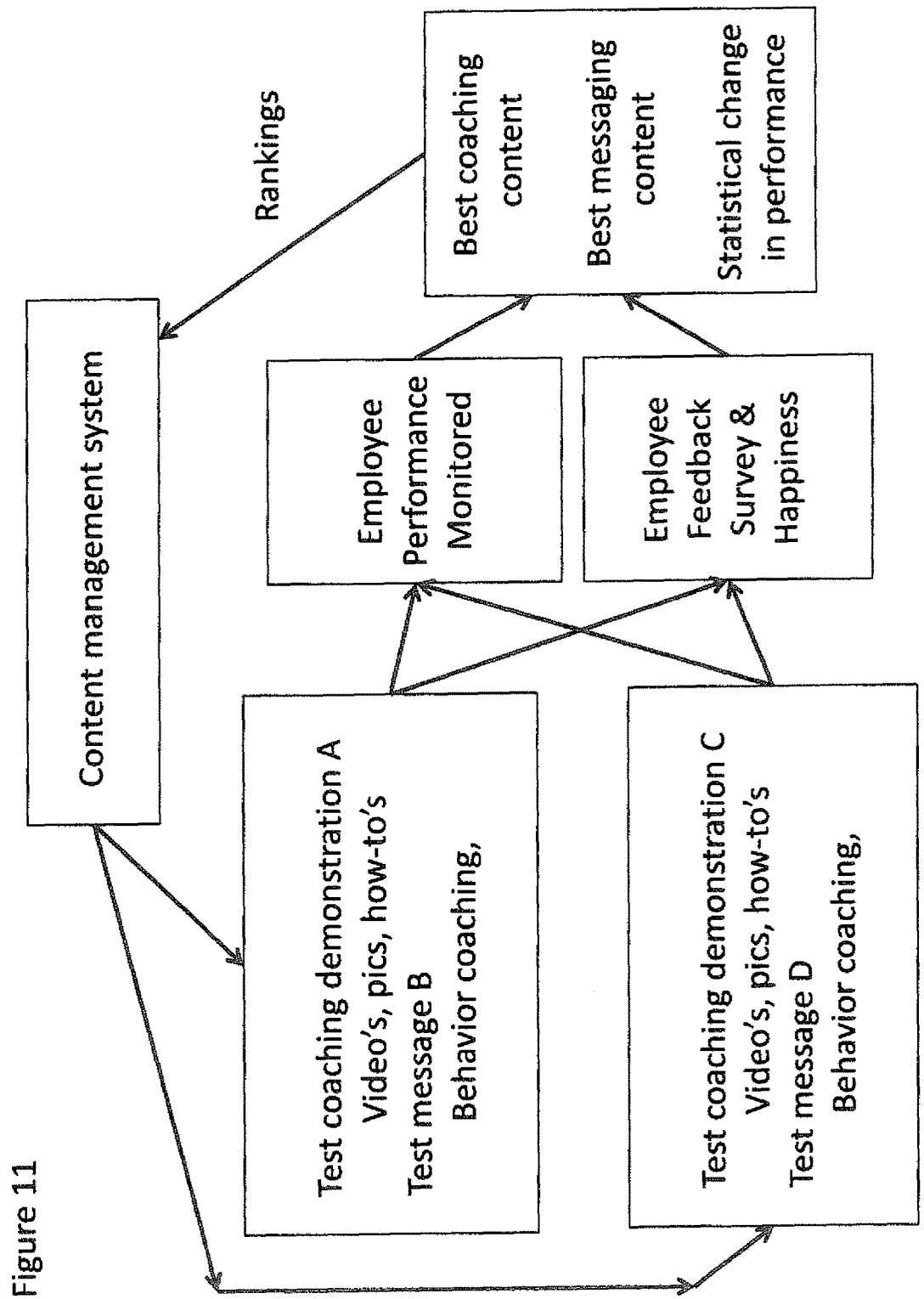
FIG. 11 shows the process loop that is automated and produces improved behavior and coaching for the specific employee types, ages and experience across the organization. This system allows test messages to tune these messages and track happiness, performance and job understanding over time and experience.

The central processor 18 may be configured to push select data to management via the manager devices 20. FIG. 6 shows an application that shows cleaning status by room and notifications that have been pushed to different levels of management and user. For example, the system 10 may advise management when tasks are started or completed, such as when maid service in a specific room begins or ends. The system 10 may be configured to push essentially any desired data to one or more of the manager devices 20. Additionally or alternatively, the manager device 20 may query the central processor for any desired information tracked by the system 10. FIG. 6 gives a simple example of rooms being requested at registration in an attempt to coordinate priorities by floor for the housekeeping.

The service tracking system 10 may provide information that is helpful in understanding employee performance. The information may include relative performance and/or trends in performance on an individual or group-wide basis. FIG. 7 shows the distribution curve and the time to normalization for the employee or the time that the employee should be at a specific level of performance. The average cleaning time, time of employment and rooms cleaned all factor into an employee score and rankings. This also helps to promote what content can be pushed to the user for training.

The service tracking system 10 may incorporate the transmission of a wide range of data. The data transmitted may vary from device to device. FIG. 8 shows the data protocol and data transfer sequence by the level of devices in one embodiment of the service tracking system 10. In this embodiment, the beacon signal transmit by a wearable device includes employee ID, wearable ID, date, time, activity hours, idle hours, associations and information data fields. For example, the associations field may include data identifying carts, vacuum and other assets, as well as data related to efficiencies of the carts, vacuums and other associations. The fixed location devices 12 may relay the information received from the wearable devices and append to that additional information associated with that fixed location device 12, such as asset ID, room ID, associations, time, date and information data fields. For example, signal strength data may be incorporated into the information data field. Asset tags may transmit a beacon signal that simply includes the equipment ID data field. Similarly, the loyalty application running on a guest's device (e.g. smartphone) may transmit a beacon signal that includes only the guest ID data field. Finally, a manager device 20 may transmit a beacon signal that includes device ID, employee ID, associations, time, date and information data fields. In Although not shown, administration and management devices can also carry the calibration flag (as discussed below) and be allowed to request coordinates, floor, or specific identifiers for location information.

Location Algorithm.

In the illustrated embodiment, the system 12 includes a calibration system configured to improve location accuracy. The calibration system implements a method of obtaining and/or evaluating beacon signal strength at known locations throughout the facility using the fixed location devices 12 so that realtime measurements can be compared against known values. Although the method of obtaining calibration information may vary, in the illustrated embodiment, the calibration system uses a mobile device 14 operating in calibration mode to transmit a calibration beacon to the fixed location devices 12. The fixed location devices 12 take measurements and push them to the coordinator device 16, which in turn communicates them to the cloud-based processor for processing and/or storage. In this embodiment, separate calibration information is collected for each room.

The content and format of the calibration beacon may vary from application to application. In this embodiment, the calibration beacon includes the calibration device ID and may also include a flag or other data field indicating that the beacon is a calibration beacon, rather than a conventional beacon. To improve performance, the mobile calibration device 14 may be configured to send a location ID with each beacon. For example, the operator may manually enter the actual location of the device into the calibration device during the calibration process. FIG. 10 is a table showing calibration beacon data and a list of specific room locations at which calibration beacons may be obtained. In this table, the calibration beacon includes a node identifier, which is a 32-512 bit identifier associated with a set of specific locations noted in the right-most column in the table. As also shown, the calibration beacon may also include a calibration flag set to "on" (e.g. "1"), a calibration room identifier (e.g. the identity of the room in which calibration is currently taking place and a floor identifier (e.g. the identity of the floor on which calibration is currently taking place). As noted above, the content and format of the data in included in this embodiment of the calibration beacon is merely exemplary, and the content and/or format may vary.

In the illustrated embodiment, the calibration process is performed on a room-by-room basis, with the central processor 18 maintaining separate data table for each room (See, for example, FIG. 9). For each room, the calibration device 14 is set to calibration mode and moved throughout the room while the fixed location devices 12 collect calibration beacon signals. The locations at which measurements are taken within a room may be predetermined or the calibration device may simply be moved throughout the room. To improve performance, a plurality of calibration beacons are collected at each location in the room. The beacon readers 12 receive the calibration beacons and determine signal strength for each. The calibration beacons and signal strength are communicated to the coordinator device 16 and from the coordinator device 16 to the central processor 18. In the illustrated embodiment, calibration occurs on a facility-wide basis in the sense that any fixed location device 16 that receives the calibration beacon will provide information to the coordinator device 16—not just the fixed location device 12 in that room.

The central processor 18 may be configured to process the calibration data in essentially any way that provides statistically relevant information for comparison of real-time beacon measurements with calibration data. In the illustrated embodiment, the central processor 18 computes the average signal strength for each fixed location device 12 and then computes a threshold range representing a percentage (e.g. 20%) of the average signal. More specifically, the central processor 18 assigns the room an upper signal strength threshold of average signal strength plus (average signal strength times twenty percent) and a lower signal strength threshold of average signal strength minus (average signal strength times twenty percent). The threshold range need not be 20%, but may vary from application to application as desired. For example, variation in the threshold range may improve performance accuracy in some applications.

FIG. 9 is a table showing the information maintained during the calibration of a single room in the illustrated embodiment. In this embodiment, the central processor 18 builds a separate table during the calibration of each separate room. For each fixed location device, the average signal strength, average signal offset (e.g. 100-average signal strength), upper threshold and lower threshold are maintained. As can be seen, this table includes information not only for the fixed location device in that room, but also the fixed location devices associated with all other rooms. Although not shown, a separate table containing the calibration beacon information for each other room that is calibrated during the calibration process. The table of FIG. 9 shows the identification and signal information that is recorded by each fixed location device 12. The columns identified as A-H represent fixed location devices that received a signal, while columns I-Z represent devices that did not receive sufficient signal to be statistically relevant. The signal, identification and location data is received, transmitted to the coordinator device 16 and relayed to the central processor 18. The information is statistically processed by the central processor 18 to determine a first series of data. That data is averaged for each location by fixed location device 12 and the signal data for each. These statistical data patterns create an image of the signal over the range of placements for a mobile device 14 that is located within that room. This combines with the floor perspective of these patterns to create a solid means to make realtime decisions on the location of the mobile device 12 based on signal strength.

During use in realtime, the central processor compares the actual signal strengths measured by the various fixed location devices with each of the calibration tables to determine which provides the best correlation with the measured data. The system 10 may use essentially any form of statistical processing and evaluation to make the comparison. In some applications, the system may use the threshold range information during processing. For example, the central processor may compare measured signal strength with the threshold range for each fixed location device. If the measured signal strength is outside the threshold, the central processor may compute a deviation score. The deviation score may be calculated using a wide range of algorithms, but in the illustrated embodiment is calculated by determining how far the measured signal is outside the threshold range. Referring again to FIG. 9, the deviation score for a signal strength with the threshold range is 0, the deviation score for a signal strength above the threshold range is the signal strength minus the upper threshold and the deviation score for a signal strength below the threshold range is the signal strength minus the lower threshold.

The service tracking system 10 may implement a rules engine associated with calibration. For example, the system 10 may implement the following exemplary rules engine:

| Rule | Description | Decision | Driver |
|---|---|---|---|
| 1 | If the sample rate for each room is less than 100 the threshold is bumped by the 20% of the present threshold until 100 confirmed samples have been reached. | Confirmed by statistical confirmation over the fixed location devices and floor levels | Many things can impact strength this fortifies the decision making |
| 2 | If the facility has multiple floors utilize the floor ID as part of the location algorithm. The floors above and below are used and a distance qualifier to the statistical location qualifier. | Tie breakers may be above or below the present floor. | Another layer of statistical significance in mapping the locations |
| 3 | If a location cannot be resolved use the statistical probability to resolve the identification of the closest fixed location device. | Collect data until a decision can be resolved | Need for statistical sampling |
| 4 | If a location tie is identified an additional sample will be taken until a location is resolved. | Break ties with x additional data | X samples resolve a tie |
| 5 | As the statistical probabilty increases or decreases for a given location increase or decrease the threshold to statistically improve the recognition to the optimal level. | Improve the probability window as the resolution increases | Identify network problem spots |

The calibration system may vary from application to application. In an alternative embodiment, the system uses a calibration flag within the mobile device to indicate when calibration signals are being transmitted. As that unique identification is sent, a calibration flag is set the mobile device requests the location as a calibration event and sends that data with the locator data. That data is then used to confirm and enable an additional plane of the location algorithm. This can be used to break ties or enable the identification of signals that are statistically variable. That data can be used to prioritize the statistical significant location data by device as well as provide yet another means to locate the locator signal. For troubled areas this can be selected manually if one method works better than another. Ideally this calibration data provides a weighted aspect of location data to the overall location algorithm.

In one embodiment, the calibration process may be set up and implemented as follows:

Set up fixed location devices 12 in rooms, hallways, tables, venues and lobbies.

Optionally, do not turn on location nodes or calibration node has a unique identifier.

With calibration application and calibration ID "on" perform a room sweep to get overall signal samples.

Sample 100 location signals from each room while within the room and at different locations within. All fixed location devices with signal strengths related to that calibration ID report to the coordinator device and consequently the central processor 18. Zero or statistically insignificant signals may be canceled or ignored.

The application requests what room you are in and logs calibration ID's and room with the identifiers.

Guest Services.

To provide additional functionality, the service tracking system 10 may be configured to interact with mobile devices carried by guests to track the position of a guest staying at the hotel and thereby provide the guest with improved or enhanced services. Guest tracking may be implemented using a smartphone application that controls operation of the beacon technology integrated into many current smartphones. This functionality may be provided through a "loyalty" application running on the smartphone. For example, guest tracking may allow housekeeping to determine when the guest is away from the room for cleaning and prevent the guest from being interrupted when in the room. Guest tracking may also allow the hotel staff to locate a guest for a wide range of applications, such as delivering food or beverages to guests enjoying hotel facilities, such as a pool, exercise room or business center. As another example, the guest's preferences may be automatically implemented when a guest enters his or her room. For example, a guest may enter into the smartphone application a set of default room preferences, such as room temperature, room lighting, television preferences, wake-up call preferences and other preferences. The service tracking system 10 may be configured to recognize when a guest enters his or her room and then implement the appropriate preferences. The service tracking system 10 may also enable the smartphone application to provide supplemental functionality. For example, location information determined by the system 10 may be returned to the smartphone application so that the application can provide a real-time map to specific locations in the hotel, such as the guest's assigned room, a restaurant, a bar, a pool, the front desk or an exercise room. The system 10 may also use the guest's location to provide the smartphone application with additional functional, such as do not disturb, room service interface, a television channel guide or pay-per-view menu when located within the guest's room, or a restaurant/bar specific menu when the guest enters a restaurant or bar. The system 10 may also use the location information to send location appropriate messages to the guest, such as a thank you or welcome message when the guest passes the front desk.

Employee Training.

In another aspect, a supplemental mobile system can be used for new employee training taking the best employee performance and teaching it to the new employees. Content management can also be facilitated with this system enabling teaching content, process steps and quality control checklists for enhanced employee performance with less human coaching. In one embodiment, the content of employee training may be determined based in part on data collected using a service tracking system in accordance with an embodiment of the present invention. For example, the service tracking system may utilize employee performance and happiness metrics collected or determined from data collected by the service tracking system.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A service tracking system for the lodging industry comprising:
    a plurality of mobile devices, each configured to periodically transmit a mobile device signal including a mobile device identification;
    a plurality of fixed location device, each configured to receive the mobile device signal and to transmit a fixed location device signal including a fixed location device identification, the mobile device identification and a signal strength of the received device signal;
    at least one coordinator device configured to receive the fixed location device signal from a plurality of fixed location devices and to transmit a coordinator device signal, the coordinator signal including the fixed location device identification, the mobile device identification and a signal strength of the received device signal; and
    a central processor configured to receive the coordinator device signal and to determine mobile device location based at least in part on the signal strength of the received device signal as communicated by a plurality of fixed location devices, whereby mobile device location is determined based on signal strength information obtained from a plurality of fixed location devices, wherein the central processor is configured to collect information and build a table of calibration data to assist in realtime determination of mobile device location, the calibration data including signal strength data, the calibration process including the collection of signal strength information for each fixed location device on a room-by-room basis, the central processor maintaining for each room a separate record of signal strength information by fixed location device, the central processor configured to identify the location of a mobile device by comparing realtime signal strength data against signal strength data stored in the calibration process; and
    wherein the central processer is configured to identity the location of a mobile device to be the room with the statistically most similar signal strength data stored in the calibration process.

2. A service tracking system for the lodging industry comprising:
    a plurality of mobile devices, each configured to periodically transmit a mobile device signal including a mobile device identification, the plurality of mobile devices including a plurality of wearable devices and a plurality of asset tags;
    a plurality of fixed location device, each configured to receive the mobile device signal and to transmit a fixed location device signal including a fixed location device identification, the mobile device identification and a signal strength of the received device signal;
    at least one coordinator device configured to receive the fixed location device signal from a plurality of fixed location devices and to transmit a coordinator device signal, the coordinator signal including the fixed location device identification, the mobile device identification and a signal strength of the received device signal; and
    a central processor configured to receive the coordinator device signal and to determine mobile device location based at least in part on the signal strength of the received device signal as communicated by a plurality of fixed location devices, whereby mobile device location is determined based on signal strength information obtained from a plurality of fixed location devices; and wherein each mobile device includes a BTLE transmitter configured to transmit a device ID.

3. The system of claim 2 wherein each fixed location device includes a BTLE receiver configured to receive the mobile device signal and a WiFi transmitter configured to transmit the fixed location device signal.

4. A method of service tracking in the hospitality industry, comprising the steps of:
uniquely associating a plurality of mobile devices with a plurality of employees, the plurality of mobile devices each configured to periodically transmit a mobile device signal containing at least a unique mobile device ID;
receiving the mobile device signal in a plurality of fixed location devices arranged at different locations throughout the facility, each fixed location device configured to receive the mobile device signal and to transmit a fixed location device signal containing a fixed location device ID, the mobile device ID from the received mobile device signal and the signal strength of the received mobile device signal;
receiving the fixed location device signals in a coordinator device, the coordinator device configured to receive the fixed location device signals and to transmit a coordinator device signal, the coordinator device signal containing a coordinator device ID, the fixed location device ID, the mobile device ID and the signal strength of the mobile device signal;
receiving the coordinator device signal in a central processor; and
determining the location of each of the plurality of employees within the facility based on the signal strengths of the mobile device signals received in the plurality of fixed location devices; and further including the steps of:
uniquely associating a plurality of mobile devices with a plurality of assets, each of the plurality of mobile devices associated with the plurality of assets configured to periodically transmit a mobile device signal containing at least a unique mobile device ID;
receiving the mobile device signal in the plurality of fixed location devices, each of the fixed location devices determining the signal strength of the mobile device signal and transmitting the fixed location device signal;
receiving the fixed location device signals in the coordinator device and transmitting a coordinator device signal; and
receiving the coordinator device signal in the central processor; and
determining a location of the plurality of assets within the facility based on the signal strengths of the mobile device signals received in the plurality of fixed location devices.

5. The method of claim 4 further comprising the steps of:
receiving in the fixed location devices a calibration signal transmit by a calibration device moved through various locations in the facility; and
wherein said determining a location step includes comparing the signal strengths of the mobile device signals received in the plurality of fixed location devices against the signal strengths of the calibration device signals received in the plurality of fixed location devices.

6. The method of claim 4 further comprising the steps of:
for each of a plurality of rooms within the facility, receiving in the fixed location devices a calibration signal transmit by a calibration device moved throughout the room; and
wherein said determining a location step includes comparing the signal strengths of the mobile device signals received in the plurality of fixed location devices against the signal strengths of the calibration device signals received in the plurality of fixed location devices.

7. The method of claim 4 further comprising the steps of:
for each of a plurality of rooms within the facility, receiving in the fixed location devices a calibration signal transmit by a calibration device moved throughout the room;
providing the signal strength of the calibration signals to the central processor, the central processor maintaining a record of calibration signal strength for each of the plurality of rooms, the signal strength data including data for a plurality of the fixed location devices; and
wherein said determining a location step includes comparing the signal strengths of the mobile device signals received in the plurality of fixed location devices against the signal strengths of the calibration device signals received in the plurality of fixed location devices.

8. The method of claim 4 further including the steps of:
providing a plurality of the mobile devices with a user input, the mobile device configured to transmit an user initiated signal upon actuate of the user input;
receiving in at least one of the fixed location devices the user initiated signal, the fixed location device transmitting a signal indicative of the actuation of the user input;
receiving in the coordinator device the fixed location signal indicative of the actuation of the user input, the coordinator device transmitting a signal to the central processor indicative of the actuation of the user input; and
the central processor initiating action in response to receipt of the coordinator device signal indicative of the user input.

9. A method of service tracking in the hospitality industry, comprising the steps of:
uniquely associating a plurality of mobile devices with a plurality of employees, the plurality of mobile devices each configured to periodically transmit a mobile device signal containing at least a unique mobile device ID;
receiving the mobile device signal in a plurality of fixed location devices arranged at different locations throughout the facility, each fixed location device configured to receive the mobile device signal and to transmit a fixed location device signal containing a fixed location device ID, the mobile device ID from the received mobile device signal and the signal strength of the received mobile device signal;
receiving the fixed location device signals in a coordinator device, the coordinator device configured to receive the fixed location device signals and to transmit a coordinator device signal, the coordinator device signal containing a coordinator device ID, the fixed location device ID, the mobile device ID and the signal strength of the mobile device signal;
receiving the coordinator device signal in a central processor; and determining the location of each of the plurality of employees within the facility based on the signal strengths of the mobile device signals received in the plurality of fixed location devices; and further comprising the steps of:

associating time with the determined location; and processing the time and location data to provide statistical information relating to performance of the plurality of employees.

10. The method of claim 4 further comprising the step of:

transmitting data representative of the location the plurality of employees and the plurality of assets to a manager device.

11. A method of service tracking in the hospitality industry, comprising the steps of:

uniquely associating a plurality of mobile devices with a plurality of employees, the plurality of mobile devices each configured to periodically transmit a mobile device signal containing at least a unique mobile device ID;

receiving the mobile device signal in a plurality of fixed location devices arranged at different locations throughout the facility, each fixed location device configured to receive the mobile device signal and to transmit a fixed location device signal containing a fixed location device ID, the mobile device ID from the received mobile device signal and the signal strength of the received mobile device signal;

receiving the fixed location device signals in a coordinator device, the coordinator device configured to receive the fixed location device signals and to transmit a coordinator device signal, the coordinator device signal containing a coordinator device ID, the fixed location device ID, the mobile device ID and the signal strength of the mobile device signal;

receiving the coordinator device signal in a central processor; and determining the location of each of the plurality of employees within the facility based on the signal strengths of the mobile device signals received in the plurality of fixed location devices; and further comprising the steps of:

transmitting a guest device signal from an electronic device associated with a guest, the guest device signal containing a guest ID associated with the guest;

receiving the guest device signal in the plurality of fixed location devices arranged at different locations throughout the facility, each fixed location device configured to receive the guest device signal and to transmit a fixed location device signal containing a fixed location device ID, the guest device ID from the received mobile device signal and the signal strength of the received guest device signal;

receiving the fixed location device signals in a coordinator device, the coordinator device configured to receive the fixed location device signals and to transmit a coordinator device signal, the coordinator device signal containing a coordinator device ID, the fixed location device ID, the guest device ID and the strength of the guest device signal;

receiving the coordinator device signal in a central processor; and determining the location of each of the guest within the facility based on the signal strengths of the guest device signal received in the plurality of fixed location devices.

* * * * *